United States Patent [19]

Claussen et al.

[11] Patent Number: 5,726,417
[45] Date of Patent: Mar. 10, 1998

[54] METHOD AND DEVICE FOR WELDING A WELD-ON PART AND A BASE PART

[76] Inventors: Carsten M. Claussen, Keithstrasse 12, D-10787 Berlin; Hartmut Ilch, Garten Strasse 14, D-77694 Kehl, both of Germany

[21] Appl. No.: 532,659

[22] PCT Filed: Apr. 16, 1994

[86] PCT No.: PCT/EP94/01185

§ 371 Date: Nov. 30, 1995

§ 102(e) Date: Nov. 30, 1995

[87] PCT Pub. No.: WO94/23889

PCT Pub. Date: Oct. 27, 1994

[30] Foreign Application Priority Data

Apr. 16, 1993 [DE] Germany ............... 43 12 439.9

[51] Int. Cl.⁶ .................................................. B23K 9/12
[52] U.S. Cl. .................................................. 219/125.11
[58] Field of Search ................... 219/125.1, 124.34, 219/125.11, 60 A, 60.2, 61

[56] References Cited

U.S. PATENT DOCUMENTS

| | | | |
|---|---|---|---|
| 2,930,883 | 3/1960 | Adamec et al. | 219/125.11 |
| 3,215,812 | 11/1965 | Smith | 219/125.11 |
| 3,501,612 | 3/1970 | Denis | 219/125.11 |
| 3,754,114 | 8/1973 | Peyrot | 219/60 A |
| 3,841,547 | 10/1974 | Bartley | 219/60.2 |
| 4,883,939 | 11/1989 | Sagi | 219/125.1 |
| 4,952,773 | 8/1990 | Orsos et al. | 219/125.1 |

FOREIGN PATENT DOCUMENTS

| | | | |
|---|---|---|---|
| 0 291 292 | 5/1988 | European Pat. Off. | |
| 35 19 696 | 12/1985 | Germany. | |
| 34 34 746 | 3/1986 | Germany. | |
| 55-1973 | 1/1980 | Japan | 219/125.11 |
| 56-89380 | 7/1981 | Japan | 219/125.11 |
| 2 254 171 | 9/1992 | United Kingdom. | |

*Primary Examiner*—Clifford C. Shaw
*Attorney, Agent, or Firm*—Gary M. Nath; Nath & Associates

[57] ABSTRACT

A device for welding a weld-on part (2) on a supporting board (3) has a handling gear (10) with a holding arrangement (12) for positioning the weld-on part (2) at a defined welding spot on the supporting board (3). The device (1) has a welding arrangement (20) whose welding element (21) may be adjusted by a positioning arrangement (30; 31–33) in at least one direction (R, θ, Z) with respect to the weld-on part (2).

14 Claims, 3 Drawing Sheets

METHOD AND DEVICE FOR WELDING A WELD-ON PART AND A BASE PART

The invention is relative to a device for welding a weld-on part to a base part which device comprises a handling device with a holding device guided by a tool arm of the handling device for grasping and positioning the weld-on part on a determinable weld-on position of the base part, as well as such a method.

Such a device and method are known from DE patent 34 34 746. It provides that a holding device attached to a tool arm of the handling device grasps a weld-on part held ready in a parts magazine which weld-on part is provided on its side facing the base part with bulges or tips for a locally limited transfer of current onto the base part. This weld-on part is then positioned by the handling device on the preprogrammed welding-on position on the base part. The weld-on part is then placed under current by means of an electrode provided in the holding device arranged in the tool arm of the handling device so that meltings sufficient for fixing the weld-on part occur at the contact positions between the weld-on part and the base workplace. After the fixing of the weld-on part on the base part the holding device is placed in a tool magazine and a welding gun is taken in its place with which gun the welding process following this tack weld is carried out in a program-controlled manner.

The arc stud welding process used in the known method and with the known device has a number of disadvantages: For the one, the position of the tack weld point is dependent on the geometry of the two parts to be connected: In order to form the arc required for welding it is indispensably necessary, as has already been described above, especially for rather large surfaces, that the weld-on part comprises projections such as e.g. bulges or tips on its side facing the base part. The formation of such ignition tips has a decisive influence on the welding result to be achieved so that the ability of the known method and of the known device to be used is limited in a disadvantageous manner from the beginning to such weld-on parts which have ignition tips. Moreover, this tip ignition method has the disadvantage that the weldings which can be performed with it can be executed in some instances only in an uneven manner and not over the entire surface of the weld-on part. In addition, a welding of workplaces with great contact surfaces or with a heavy weight is not possible.

Moreover, the known device allows the weld-on part and the base part to be welded by means of the so-called lift ignition method. This method provides that after the weld-on part has been placed on the base part the former is lifted off from the latter and an arc is ignited with simultaneous cutting in of a welding current. Then, the maximum welding current is applied in the uppermost lift position and the two welding parts are locally melted by the arc. After an adjustable period in the millisecond range the weld-on part is let loose from the holding device and dips into the melting bath on the base part, wherewith the tack weld has been carried out. Such a lift welding method has the disadvantage that the direction of lift must always take place in the direction of gravity in order to be able to carry out the dipping of the weld-on part, effected by the force of gravity, into the melting bath on the base part. Thus, since a welding in any spatial orientation desired is not possible, provision is made in the case of the known device that the base part is brought into a suitable position. Such a method of procedure is difficult to carry out in the case of large base parts and moreover limits in a disadvantageous manner the geometry of the base parts which can be welded with the known method and the known device.

A further disadvantage of the known method and of the known device is that after the tack weld step has been carried out the holding device grasping the weld-on part is placed in a tool magazine and a welding gun must be taken into the tool arm of the handling device in order to carry out the welding-on process. This additional method step is time-consuming and therefore reduces in a disadvantageous manner the cycle rate which can be achieved with the known method and the device operating according to this method.

DE-OS 39 10 95 teaches a welding device for producing a welding connection between a wheel rim and a wheel key [ratchet wrench] of an auto rim which are automatically welded to one another at the so-called tabs with the aid of welding heads on individual partial pieces by selectively and simultaneously activating four or five welding heads distributed over the circumference. In this known welding device the wheel key and the rim ring, which are already aligned, are placed on a stationary, height-adjustable lower tool which can rotate about a vertical central axle [axis] of the device and are held fixed in position by being moved against an upper tool for producing the welding connection. A welding device which can rotate about the central column of the device is provided above the fixing device for the auto rim which device is formed by the lower tool and the upper tool. This welding device comprises for or five welding heads for producing four or five welding seams per rim circumference. The welding heads are controlled by two different cranks in the form of adjustment disks and are directed by control rollers so that different rim diameters can be welded.

The known device is limited in a disadvantageous manner to the welding of a wheel rim and a wheel key of an auto rim by means of welding seams lying in a plane and exhibiting a circular shape; in addition, the parts to be welded must also be held against each other in a non-positive manner before the welding. A transfer of the procedure known from the above-mentioned Offenlegungsschrift [published, non-examined patent application] to a device for welding a weld-on part with a base part in which the weld-on part is grasped by a holding device of the handling device and is then positioned on the base part is in principle not possible on account of the requirements and boundary conditions occurring in the two different devices. EP 0.528,321 A1 teaches a device for setting and welding flat form parts into recesses of plate slabs in which a rotary table is provided comprising four similar clamping tables like a merry-go-round [roundabout rotary platen]. In a first work station a plate slab is placed by a transport device or manually on the clamping table and let down in a preadjusted manner with its recess over the center part of the clamping table. The plate slab is then fixed on the clamping table by appropriate holding elements and the rotary table is rotated until the clamping table carrying the plate slab reaches a centering station. A combined centering device for the plate slab and for a form part to be set into the recess of the plate slab is located in this station over the clamping table. After the plate slab has been centered on the clamping table and the form part been set into the plate-slab recess the clamping table is moved by the rotary table under a welding table which comprises a clamping device arranged over the clamping table and which clamping device can be lowered against the plate slab and the form part. The plate slab end the form part can be clamped fast with this clamping device, which comprises a freely rotatably mounted clamping cheek for the form part and a freely rotatably mounted, annular clamping cheek for the plate slab. These clamping cheeks allow an annular slot free between themselves as the joint lies between the plate slab and the form part. A welding device is directed to this joint which device permits a three-dimensional adjustment of its welding element. A welding seam connecting the plate slab end the form part can be produced by moving the plate slab in a passing manner in conjunction with a corresponding movement of the welding element.

This device is also greatly limited in its ability to be used and permits only a welding connection of two welding parts by a welding seam lying in one plane. A use of the procedural principle [approach] known from the above-mentioned European patent application on a device in which a weld-on part can be positioned on a defined position on a base welding part by means of a handling device is likewise not possible here on account of the different initial prerequisites and boundary conditions occurring in these devices, which are not comparable to one another.

In order to avoid these disadvantages the invention has the problem of further developing a method and a device of the initially cited type in such a manner that a more universal and more flexible use is assured. This problem is solved by the device in accordance with the invention in that the device comprises a welding device located on the tool arm of the handling device, the welding element of which welding device can be moved by a positioning device in at least one direction relative to the weld-on part in that the welding element of the welding device can be moved by a first positioning unit of the positioning device in a first direction running essentially concentrically to the main axis of the holding device and/or that the welding element of the welding device can be moved by a second positioning unit of the positioning device in a second direction running essentially radially to the main axis of the holding device and/or that the welding element of the welding device can be moved by a third positioning unit of the positioning device in a third direction running essentially orthogonally to the first and the second directions.

The measures of the invention make it possible to bring it about in an advantageous manner that the welding element can be guided to and around the weld-on part when the handling device is standing by means of additionally driven and controlled shafts in order to carry out at defined positions a tack weld of the weld-on part on the base part. It is therefore no longer necessary to provide a separate and therefore complicated and expensive tacking device for this position fixing of the weld-on part. This complete elimination of the tacking device required in the known devices considerably reduces the production costs for the device of the invention in an advantageous manner.

It is possible in the device according to the invention to weld weld-on parts formed in any manner by means of the ability provided by the invention of the welding element to be positioned relative to the piece to be welded on so that the device of the invention can be used more flexibly and more universally in an advantageous manner.

The method of the invention for welding a weld-on part to a base part in which the weld-on part is positioned at a defined welding position of the base part by a handling device comprising a holding device and is tack welded provides that a welding device cooperating with the handling device is used for the tack welding, the welding element of which welding device is adjusted by a positioning device in at least one direction relative to the weld-on part.

A method is created by these measures of the invention which is distinguished over the known method in an advantageous manner by a more flexible and universal ability to be used.

Further advantageous further developments of the invention are defined in the subclaims.

Further details of the invention can be gathered from the exemplary embodiment described in the following with reference made to the figures.

Figure 1:
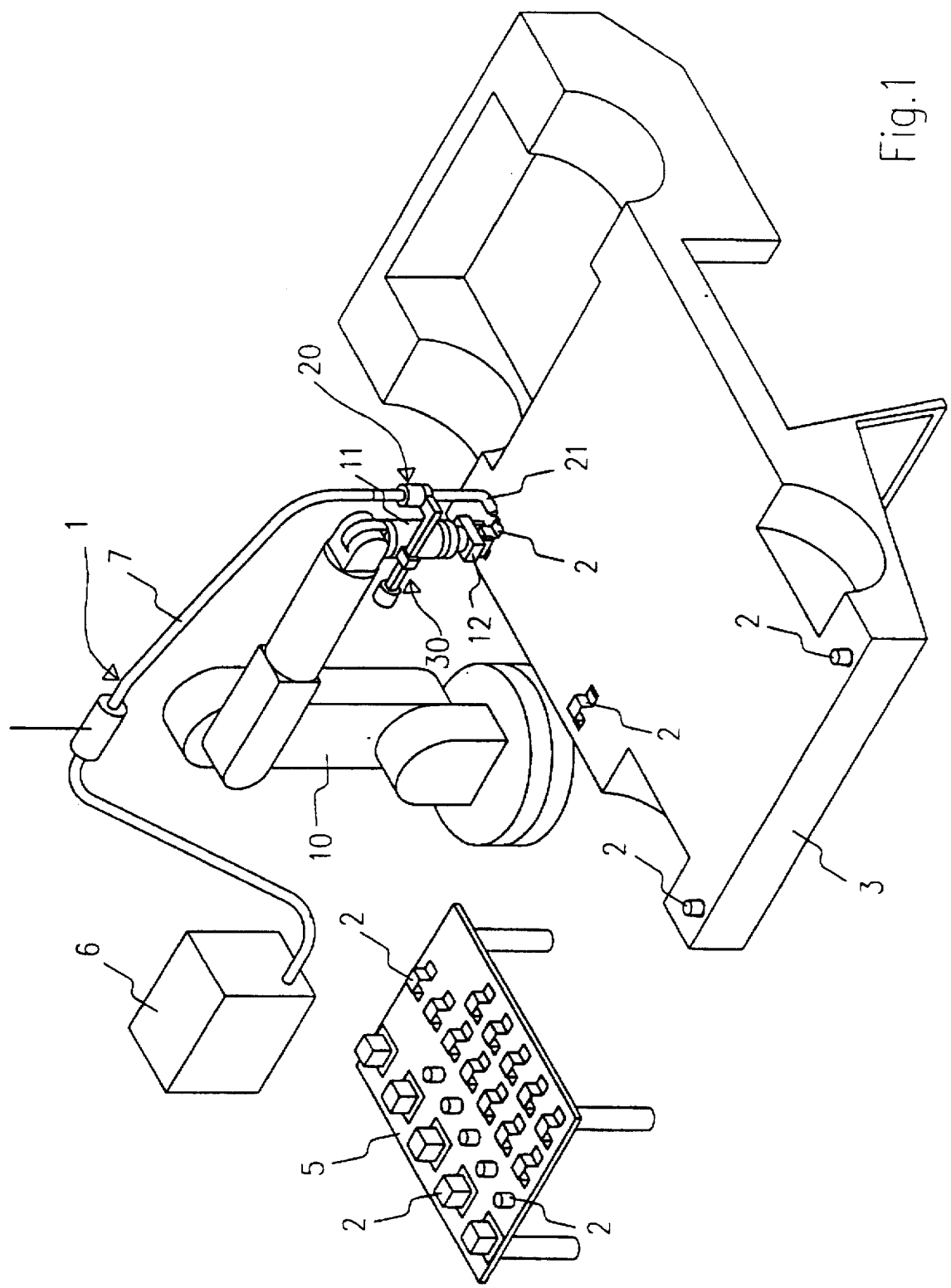
FIG. 1 shows an exemplary embodiment of the device.

The exemplary embodiment of a device 1 shown in FIG. 1 for welding a weld-on part 2 to a base part 3 comprises a six-axle [six-shaft] robot 10 with bending arm which robot functions as a handling device and on tool arm 11 of which grasping device 12 is arranged. Several weld-on parts 2 with differing geometry are held in weld-on-part magazine 5 which can be taken up by grasping device 12 of robot 10 and positioned on base part 3 in a defined manner.

It is important that device 1 comprises a welding device designated in general by 20 and consisting essentially of welding element 21 and positioning device 30 which moves welding element 21 relatively to weld-on part 2. This positioning device 30 of welding device 20, which positioning device preferably forms three additionally driven and controlled shafts [axes] advantageously permits welding element 21, which is connected to welding-current source 6 via hose packet 7 suspended on a movable beam, to move on and around weld-on part 2 in order to fix weld-on part 2 in position relative to base part 3 at predefined locations by a tack weld.

Figure 2:
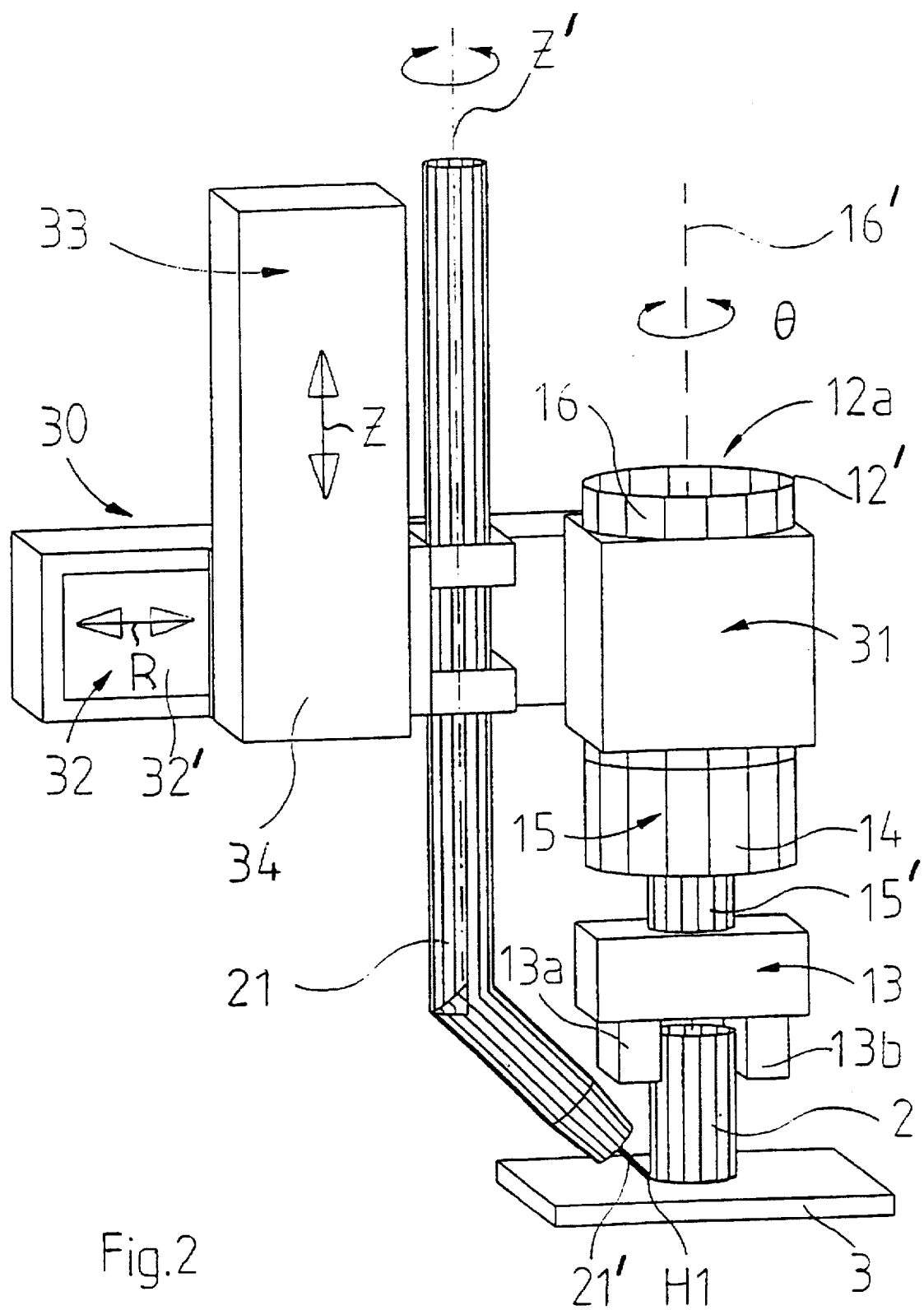
FIGS. 2 and 3 show a view of a welding device of the exemplary embodiment.
Figure 3:
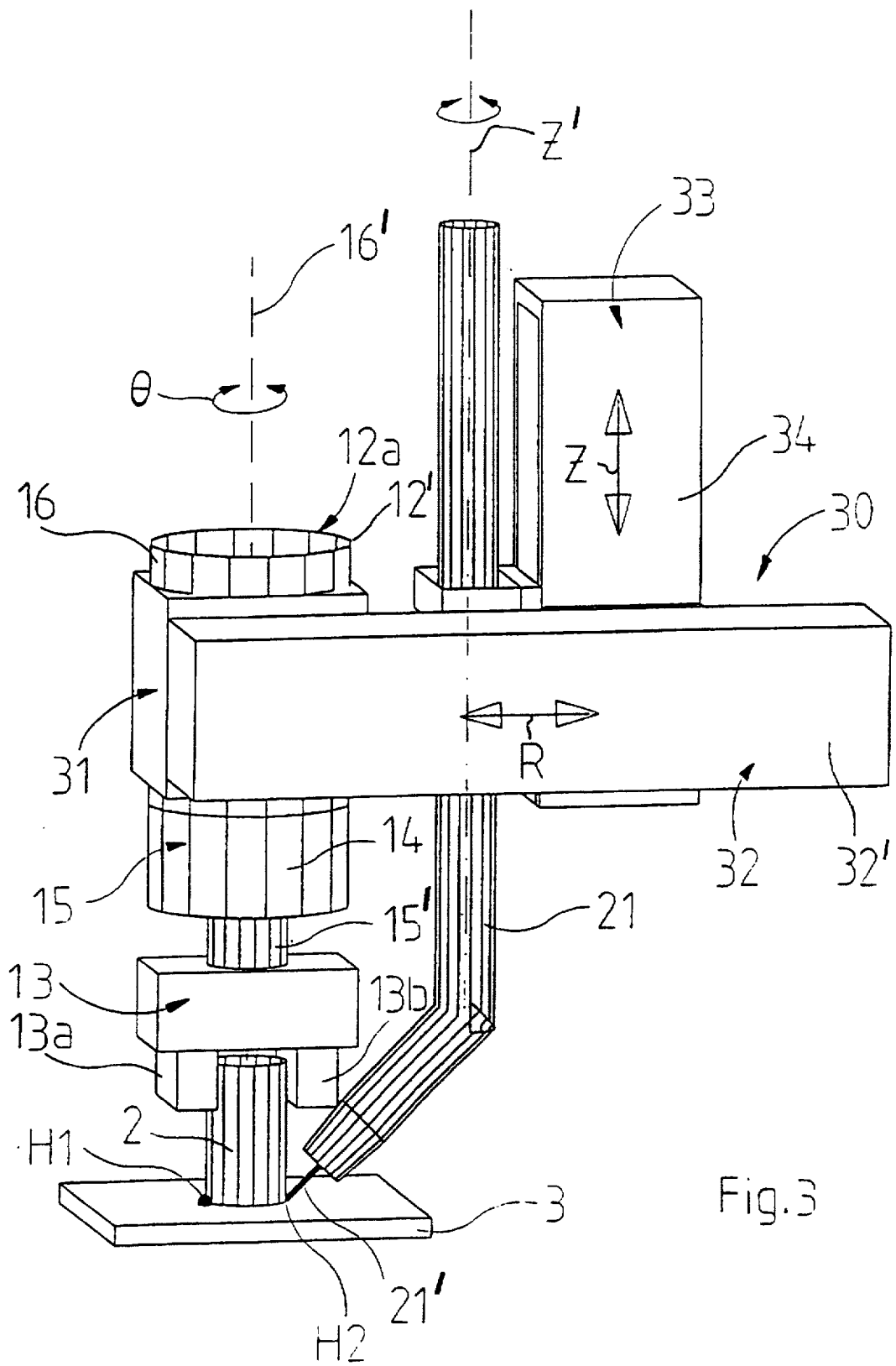

FIGS. 2 and 3 show grasping device 12 together with welding device 20, which preferably operates according to the MAG method. Grasping device 12 comprises coupling device 12a at its upper end 12' which coupling device is known and therefore not shown in detail. This coupling device cooperates with tool arm 11 of six-axle robot 10 with the bending arm (tool arm not shown in FIGS. 2,3) so that grasping device 12 can be looked in a replaceable manner together with welding device 20 on tool arm 11. This makes it especially simple to retrofit existing handling devices with the described wielding device. Grasping device 12, which can pivot from tool arm 11 of six-armed [sic] robot 10 with bending arm about a vertically running axis (see FIG. 1) comprises on its end facing away from tool arm 11 grasping element 13 comprising two grasping cheeks 13a, 13b for receiving weld-on parts 2. Such a grasping element 13 is known, so that a detailed description of this element is not necessary at this point. It should merely be pointed out that gasping elements 13 are preferably used which form a relatively large grasping opening so that many different weld-on parts can be grasped directly in succession and without a change of grasping elements 13 and positioned for tack welding on base part 3.

Cylindrical housing 14 is arranged over grasping element 13, in the interior of which housing a lifting device 15 is contained of which only lifting piston 15' contacting grasping element 13 can be seen in FIGS. 2, 3. Lifting mechanism 15 comprises a path measuring system with an inductive path sensor [sensing element] arranged parallel to lifting piston 15' so that the lifting [stroke] motion of grasping element 13 can be precisely detected. Housing 14 is connected via a further coupling device (not shown in the figures) to a further housing 16 of grasping device 12 so that grasping element 13 can be separated from the further housing 16 together with lifting device 15 contained in housing 14 and thus deposited in a grasper repository.

This further housing 16 of grasping device 12 serves as axis of rotation [pivot] for a first positioning element 31 of positioning device 30 of welding device 20 in such a manner that welding device 20 can rotate about main axis 16' of grasping device 12 to which essentially cylindrical, further housing 16 of grasping device 12 runs coaxially. The first positioning element 31 of welding device 20 thus forms a first driven shaft which can be controlled via a corresponding control unit (not shown in the figures) of positioning device 30. The degree of rotational freedom created thereby therefore makes it possible that welding element 21 of welding device 20 can move about weld-on part 2 received in grasping element 13 in a first direction of movement θ over a defined angular range, preferably over 360°.

A second degree of freedom of welding element 21 of welding device 20 is formed in that it can be shifted by a second positioning element 32 in a radial direction R relative to main axis 16' of grasping device 13. A third degree of freedom of welding element 21 of welding device 20 is realized in that positioning device 30 of welding device 20 comprises a third positioning element 33 which makes possible a shifting motion of welding element 21 in a third direction of movement Z running orthogonally to the two directions of movement θ and R.

It is furthermore possible to form a fourth degree of freedom of welding element 21 by providing that welding element 21 can rotate about axis Z' running parallel to the third direction of movement Z. This fourth degree of freedom of welding element 21 makes it possible in an advantageous manner that the latter can be positioned relative to weld-on part 2 in a position which is optimized in relation to the welding seam to be produced.

The design of the three positioning elements 31–33 of positioning device 30 of welding device 20 is such that positioning device 30 comprises a carrier 32' extending in the second direction of movement R which carrier can rotate by means of a drive means not shown in detail in the figures about further housing 16 and thus about main axis 16' of grasping device 12. Crosspiece 32 can be shifted on this carrier 32' by a second drive means (also not shown), on which crosspiece the welding element 21 is located. This welding element 21 can shift by means of a third drive means in the third direction of movement Z. The described design of the three positioning elements 31–33 has the advantage that it permits an especially easy construction. This is especially significant because position device 30 of welding device 20 is carried by robot 10 with the bending arm. The carrying load of such handling devices is generally limited, so that the useful load which can be handled [managed] by robot 10 with bending arm is not significantly limited on account of the easy construction of positioning device 30. Moreover, the described design Of positioning device 30 has the advantage that it permits a modular construction. It is therefore advantageously possible to adapt the individual positioning devices 31–33 in an especially simple manner to different geometries and weight classes of the work pieces to be processed.

The method for welding a weld-on part 2 to a base part 3 takes place as follows:

Six-armed robot 10 with bending arm moves grasping element 13 of grasping device 12 to weld-on-part magazine 5. Weld-on part 2 to be welded is grasped and positioned by robot 10 over the intended position on base part 3. After weld-on part 2 has been brought into this predefined position robot 10 remains in this defined position until the end of the method step of the tack weld following this positioning step. This predefined position is selected in such a manner that no collision can occur between weld-on part 2 and base part 3, taking into consideration the manufacturing and/or position tolerances of the two parts 2,3 to be welded.

Lifting device 15 of grasping device 12 then sets weld-on part 2 on base part 3, during which the path measuring system integrated in lifting device 15 measures the lifting path of grasping element travelled. This detection of the lifting path advantageously makes it possible to recognize the individual manufacturing and/or position tolerances of the two parts to be welded so that even in the case of such tolerances an exact positioning of welding element 21 on the intended tack weld point is possible in an especially simple manner in the tack process following the positioning process.

The two-stage positioning of weld-on part 2 on base part 3 described has the advantage that the pre-positioning of weld-on part 2 by robot 10 can be carried out especially rapidly since there is no danger of collision in this rough positioning. The subsequent fine positioning can then likewise be carried out especially rapidly and precisely by lifting mechanism 15 of grasping device 12.

Then, the third positioning unit 33 of welding device 20, which unit is preferably CNC-controlled via the control device of positioning device 30, positions welding-wire tip 21' of welding element 21 into a predefined initial position, e.g. approximately 10 mm above base part 3. Thereafter, welding-wire tip 21' is brought into the first tack weld position shown in FIG. 2—taking into consideration the measured lift path of gasping element 13 for the purpose of tolerance compensation—by means of the third positioning unit 33 and the likewise preferably CNC-controlled second positioning unit 32 of positioning unit 30 of welding device 20. After a first tack weld point H1 is set, welding element 21 and thus welding-wire tip 21' is moved away from the first tacking position and in the direction of the second tack-weld point H1 [sic]. Provision is made to this end that the second positioning unit 32 moves welding element 21 away in radial direction R and possibly the third positioning unit 33 in vertical direction Z in such a manner that welding element 20 can be rotated in an unimpeded manner by the preferably CNC-controlled first positioning unit 31 of welding device 20 in direction of movement θ to a second tack-weld point H2 (see FIG. 3). The production of the second and possibly further tack-weld points now takes place as described above. After the appropriate number of tack-weld points has been set, lifting mechanism 15 integrated in housing 14 of grasping device 12 pulls with closed grasping element 13 with an adjustable testing force on tack-welded weld-on part 2. At the same time the grasping control monitors the electric contact between weld-on part 2 and base part 3 as well as the signals of the path-measuring system of lifting mechanism 15 to see whether the testing force applied to weld-on part 2 occasioned a change in position which characterizes an insufficient tacking of weld-on part 2 to base part 3. This control assures that weld-on part 2 is sufficiently tack-welded to base part 3, which assures a one hundred percent quality assurance in an advantageous manner.

After the successful conclusion of this traction test the welding of weld-on part 2 takes place as the next method step. It can be provided to this end, if the geometry of grasping element 13 and/or of grasping device 12 does not constitute a problematic contour for the welding process, that the welding process is carried out without opening grasping element 13 immediately after the tack weld carried out for the positional fixing of weld-on part 2 on base part 3. This instance occurs especially in the case of rotationally symmetric weld-on parts 2 which are set with their front surfaces on a horizontal, level surface. In order to carry out this welding process it is provided that welding element 20 is guided around and on weld-on part 2 by the three positioning units 31–33 of positioning device 30 of welding device 20.

The optionally provided fourth degree of freedom of welding element 21 makes it possible in an advantageous manner during the welding of non-rotationally symmetric weld-on parts 2 to move welding-wire tip 21' of welding element 21 into a position relative to weld-on part 2 which is optimal for welding, so that it is advantageously assured that even in the case of a welding seam which does not run concentrically to the third direction of movement Z a welding quality is given which satisfies the requirements placed on the welding.

A tack-welding and/or welding of clamped weld-on part 2 is especially advangageous if weld-on part 2 is to be tacked or welded only on one side. The fixing of weld-on part 2 by grasping device 13 then prevents weld-on part 2 from moving or tilting due to thermal distortion onto the side of the tack weld or welding.

If the geometry of grasping element 13 presents problematic contour during the welding process so that weld-on part 2 can not be welded immediately after the tack welding, it is provided that grasping cheeks 13a, 13b of grasping element 13 are opened, grasping unit 12 moved away from weld-on part 2 and preferably set down automatically in a grasper repository of device 1. Then welding element 21, which is preferably formed as a welding gun, is moved into the so-called tool center point and fixed there. This fixing on the tool center point, that is, on the point toward which the control of robot 10 with the bent arm is aligned, advantageously permits welding element 21 to then be used like a traditional robot welding pistol for welding weld-on part 2.

We claim:

1. A device for welding a weld-on part (2) to a base part (3) which device comprises a handling device (10) with a holding device (12) guided by a tool arm (11) of the handling device (10) for grasping and positioning the weld-on part (2) on a determinable weld-on position of the base part (3), which device (1) comprises a welding device (20) arranged on the tool arm (11) of the handling device (10), the welding element (21) of which welding device (20) can be adjusted by a positioning device (30; 31–33) in three directions relative to the holding device (12), characterized in that the welding element (21) of the welding device (20) can be moved by a first positioning unit (31) of the positioning device (30) in a first radial direction running essentially concentrically to the main axis (16') of the holding device (12), a second positioning unit (32) of the positioning device (30) in a second horizontal direction running essentially orthogonally to the main axis (16') and also running essentially radially to the main axis (16') of the holding device (12), and a third positioning unit (33) of the positioning device (30) in a third vertical direction running essentially parallel to the main axis (16'), wherein each of said first positioning unit (31), said second positioning unit (32) and said third positioning unit (33) can be moved independently from each other, furthermore, that the positioning device (30) comprises a carrier (32') extending in the second horizontal direction which can rotate by means of a first drive means about the main axis (16') of the holding device (12), and on which a crosspiece (34) can shift in the second horizontal direction by means of a second drive means and that the welding element (21) is arranged on the crosspiece (34) which element can be shifted by a third drive means in the third vertical direction, furthermore that the welding element (21) can rotate about an axis (Z') parallel to the third vertical direction of movement.

2. The welding device according to claim 1, characterized in that the welding element (21) can be aligned with the tool center point of the handling device (10).

3. The welding device according to claim 1 wherein the holding device (12) comprises a lifting mechanism (15) which shifts a grasping element (13) or the holding device (12) and that the lifting mechanism (15) comprises a path measuring system for detecting the lifting movement of the grasping element (13).

4. The welding device according to claim 3, characterized in that a defined testing force can be applied to the weld-on part (2) by the lifting mechanism (15).

5. The welding device according to one of claims 1 to 4, characterized in that the device (1) comprises means for registering a mechanical, electrical, or mechanical and electrical contact between weld part (2) and base part (3).

6. The welding device according to claim 1, characterized in that the positioning units (30–33) of the positioning devices (30) of the welding device (20) can be CNC-controlled.

7. A method of welding a weld-on part (2) to a base part (3) in which the weld-on part (2) is grasped by a holding device (12) guided by a tool arm (11) of a handling device (10) and positioned on a determinable welding site of the base part (3) and then tack welded, for which tack welding a welding device (20) arranged on the tool arm (11) of the handling device (10) is used the welding element (21) of which is adjusted by a positioning device (30; 31–33) in at least one of a first radial direction running essentially concentrically to a main axis (16') of a holding device (12) relative to the weld-on part (2), a second horizontal direction relative running essentially orthogonal to the main axis (16')relative to the weld-part (2), or a third vertical direction running essentially parallel to the main axis (16') relative to the weld-on part (2), wherein each of said first radial direction, second horizontal direction, and said vertical direction are movable independent from each other, characterized in that the holding device (12) holds the welding part (2) during the tack welding and the welding element (21) of the welding device (20) is guided by positioning elements (31–33) of the positioning device (30) onto and at least partially around the weld-on part (2).

8. The welding method according to claim 7, characterized in that after the tack welding of the weld-on part (2) to the base part (3) the holding device (12) is moved away from the weld-on part (2).

9. The welding method according to claim 7 or 8, characterized in that the holding device (12) is set down before the welding of the weld-on part (2) in a grasper repository.

10. The welding method according to one of claims 7 or 8, characterized in that after the tack welding the weld-on part (2) is loaded with a tractive force.

11. The welding method according to one of claims 7 or 8, characterized in that the welding element (21) of the welding device (20) is aligned with a tool center point for welding the weld-on part (2) to the base part (3) and that the movement of the welding element (21) necessary for welding the weld-on part (2) is executed by the handling device (10).

12. The welding method according to claim 7 or 8, characterized in that the holding device (12) is set down before the welding of the weld-on part (2) in a grasper repository, and also characterized in that after the tack welding the weld-on part (2) is located with a tractive force.

13. The welding method according to claim 7 or 8, characterized in that the holding device (12) is set down before the welding of the weld-on part (2) in a grasper repository, and also characterized in that after the tack welding the weld-on part (2) is located with a tractive force, and also characterized in that the welding element (21) of the welding device (20) is aligned with a tool center point for welding the weld-on part (2) to the base part (3) and that the movement of the welding element (21) necessary for welding the weld-on part (2) is executed by the handling device (10).

14. The welding method according to claim 7 or 8, characterized in that the holding device (12) is set down before the welding of the weld-on part (2) in a grasper repository, and also characterized in that the welding element (21) of the welding device (20) is aligned with a tool center point for welding the weld-on part (2) to the base part (3) and that the movement of the welding element (21) necessary for welding the weld-on part (2) is executed by the handling device (10).

* * * * *